United States Patent [19]
Stroh

[11] 3,918,482
[45] Nov. 11, 1975

[54] RELIEF VALVE CORE
[75] Inventor: William Sylvester Stroh, Dickson, Tenn.
[73] Assignee: Scovill Manufacturing Company, Waterbury, Conn.
[22] Filed: Mar. 7, 1974
[21] Appl. No.: 448,881

[52] U.S. Cl. .............................................. 137/542
[51] Int. Cl.² ....................................... F16K 15/06
[58] Field of Search . 137/540, 542, 543.13, 543.15, 137/543.17, 543.19, 543.21, 543.23, 234.5; 251/337; 85/50 R

[56] References Cited
UNITED STATES PATENTS

| | | |
|---|---|---|
| 2,124,844 | 7/1938 | Boroughs .................. 137/543.15 X |
| 3,018,914 | 1/1962 | Webster ............................... 220/3 |
| 3,048,188 | 8/1962 | Hunter ...................... 137/543.15 X |
| 3,084,710 | 4/1963 | Gondek ....................... 251/337 X |
| 3,199,533 | 8/1965 | Barber .......................... 137/543.13 |
| 3,430,647 | 3/1969 | Suchowolec .............. 137/543.17 X |
| 3,568,736 | 3/1971 | Linch et al ...................... 251/149.6 |
| 3,601,154 | 8/1971 | Demler, Jr. ................ 137/543.19 X |
| 3,605,793 | 9/1971 | Kinsel ....................... 137/543.13 X |

Primary Examiner—William R. Cline
Attorney, Agent, or Firm—Dallett Hoopes

[57] ABSTRACT

The invention relates to a relief valve core adapted to be screwed into a valve housing in a pressure vessel much the same way a valve core is screwed into a tire valve housing. The core of the invention comprises a threaded body adapted to engage threads in the housing. The body has an axial bore through which a pin extends, and a spiral compression spring extends downward from the body and circumposes the pin. The pin carries at its lower end a downward cup carrying a downwardly-facing sealing washer also circumposing the pin. The washer is adapted to seat on a seat provided in the housing coaxial with the threads in the housing. The invention involves improvement wherein an antifriction washer is disposed between the lower end of the spring and the upper wall of the cup.

4 Claims, 3 Drawing Figures

RELIEF VALVE CORE

BACKGROUND OF THE INVENTION

1. Field of the Invention

This invention relates to pressure relief valves and more particularly such valves in the form of a core adapted to be inexpensively manufactured and to be screwed into a housing mounted, for instance, in the wall of a pressure vessel. Subsequently, the valve is adapted to unseal in the event of excess pressure buildup in the vessel. Such relief, of course, prevents explosion of the vessel.

2. Description of the Prior Art

In the prior art, there have been pressure relief valves in which a resilient sealing washer has been pressed against a valve seat by a spring which is held in compression by a threaded body threadedly engaging threads in the structure in the housing above the seat. The threaded body has been set at a depth at which the desired pressure is urged against the sealing washer by the spring.

Various attempts have been made in the past to incorporate such a pressure relief valve into a housing in a manner similar to the way in which a core fits into the housing or body of an automobile tire valve. It has been generally conceded that such a valve core, if it could be made accurate, would be desirable in that such cores are generally inexpensive to manufacture and can be readily removed for cleaning, repair, and replacement.

Several drawbacks have been clearly manifest in such relief core valves as attempted in the prior art. The biggest drawback has been that with the structures in the art, the seating of the valve by screwing the threaded body downwardly in the housing has caused rotation of the compression spring which in turn has also resulted in the rotation of the sealing washer against the valve seat. This relative rotation has distorted the sealing washer and has caused its spreading out of place with respect to the seat so that there has been the danger of the washer being outwardly extruded by the fluid pressure. In addition, the distortion has resulted in great variations and discrepancies in the unsealing pressure of the valve so that the valve has permitted relief of the housing at pressures other than those desired. In other words, the unsealing has not been uniformly repeatable from one valve to the next or, for that matter, in successive unsealings of the same valve.

SUMMARY OF THE INVENTION

Under the present invention, antifriction means are provided between the threaded body described above and the valve washer so that as the body is twisted, it does not automatically result in the twisting of the sealing washer. As a result, unsealing pressures of the valve under the present invention can be much more accurately prearranged for and the repeatability of the unsealing is more uniform. The invention further involves the confinement of the sealing washer against outward displacement or extrusion by the fluid pressure.

BRIEF DESCRIPTION OF THE DRAWINGS

Other features and objects of the invention will be apparent from a review of the following specification including the drawings, all of which disclose non-limiting embodiments of the invention. In the drawings.

DESCRIPTION OF THE PREFERRED EMBODIMENT

Figure 1:
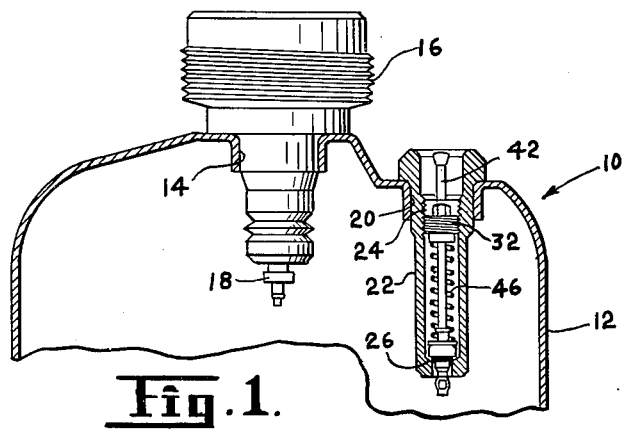
FIG. 1 is a fragmentary sectional view showing a pressure vessel having a valve housing containing a relief valve core embodying the invention.

Referring more specifically to the drawings, FIG. 1 is a fragmentary view showing the upper portion of a pressure vessel generally designated 10 of the type that is used to contain liquid petroleum gas, for instance. The vessel comprises a metal container 12 having a central opening 14 in which is brazed or otherwise secured, a fitting 16 containing the conventional fill valve core 18 (only partly shown) similar to that used in a tire valve. Such a fitting may be connected to a torch head, stove, lantern, as is well known in the art. A second opening 20 is provided in the vessel 12 and offset from the axis thereof. In it is brazed or otherwise secured, a valve core housing 22.

As shown in FIG. 1, the housing has a central bore which is interiorly threaded as at 24 and an upwardly facing valve seat as at 26 therebelow. The purpose of the housing 22 is to mount the relief valve core so that as pressure within the vessel 12 builds up, automatic escape of such pressure above a certain magnitude will be accomplished by the relief valve, thereby preventing the explosion of the vessel.

Figure 2:
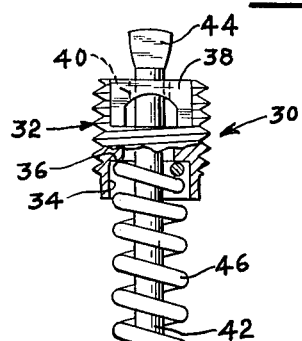
FIG. 2 is an enlarged elevational view, partly in section, of a relief valve core embodying the invention.

A relief valve core embodying the invention is shown in FIG. 2 and generally designated 30. As shown, the core comprises a cylindrical threaded body 32 similar to that of a tire valve core and having an axial recess 34 extending up from the lower end thereof. As shown, the recess is stepped inward to provide an annular shoulder 36, for reasons which will appear. Fluid may pass axially through the body. Extending transversely across the upper portion of the body 32 is a conventional bridge 38 which has a bore 40 on the axis of the housing.

As with a conventional tire valve core, the transverse bridge 38 is engaged by a special wrench to screw the body 32 into or out of the housing.

Figure 3:
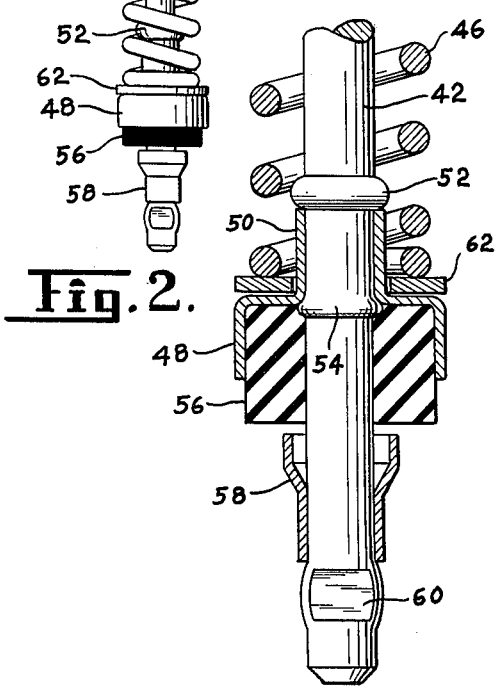
FIG. 3 is a greatly enlarged fragmentary sectional view of the lower end of the core of FIG. 2.

In the FIG. 2 and FIG. 3 embodiment, a pin 42 is received into the bore 40 and is flattened as at 44 in a conventional manner. The pin is surrounded by a conventional axial compression spring 46 which, at its upper end, engages the shoulder 36.

A sealing washer plunger cup 48 is provided at the lower end of the core. It is preferably of metal and has a central opening having an upwardly extending bushing 50 extending thereabout. As shown in FIG. 3, the cup is secured to the pin 42 by upset portions of the pin above the bushing as at 52 and therebelow as at 54.

Snugly embracing the lower portion of the pin 42 is an annular sealing washer 56 which is disposed in the cup 48 so that the side walls of the cup 48 confine the outward movement of the sealing washer 56. The washer 56 is preferably of rubber and is adapted in operation to seal against the seat 26 in the housing 22.

Secured to the pin 42 below the washer 56 is a funnel-shaped valve guide 58, tightly encompassing the pin which holds the guide against vertical displacement with respect to the pin. The upper end of the guide 58 serves to engage the lower surface of the washer 56 should it tend to become dislodged out of its cup upon unseating. The sloping side walls of the guide 58 can engage the seat 26 during installation, for instance, and help guide the pin. Also, if the lower end of the pin becomes disoriented after unseating, the guide can assure clear engagement with the seat 26. Adjacent its lower end, the pin is staked as at 60 to assure that the guide 58 cannot come off the lower end thereof.

Attention is now focused on the antifriction washer 62. As shown, this washer superposes the pin and the bushing 50 and seats on the radial wall of the cup 48 sandwiched between that wall and the lower end of the compression spring 46.

For reasons which will appear, the character of the antifriction washer is of extreme importance. In a preferred embodiment, the washer is sufficiently thick to resist distortion in service. The thickness should be at least 10% of the outside diameter of the washer for this reason. The base metal of the washer is selected of a material sufficiently hard to resist penetration of the end of the spring 46 into the surface of the material of the washer. For this reason, a material having a hardness of at least 75 on the Rockwell B scale is preferred. The base material of the washer has a comparatively smooth finish so as to keep friction at a minimum. The surface finish preferably does not exceed 63 microinches by the standards commonly designated in the trade. Preferably, a plating is disposed on the washer to increase the lubricity of the surface. Preferably, the plating is electrodeposited and of either cadmium, tin, nickel or the like, most preferably cadmium. Preferably, the plating does not exceed a thickness of 0.0003 inch, and is cadmium, most preferably.

In the use of the core embodying the invention and described in FIGS. 1 through 3, the lower end thereof is inserted into the housing 22 from the outside of the vessel 12 and made to extend downward until the threads on the body 32 engage the threads 24 in the housing. The body 32 is then screwed further downwardly until a known preset depth is arrived at, such depth equating to a given compression of the spring 46. This compression results in a known unsealing pressure of the valve, involving at that pressure, the upward movement of the washer, cup and pin assembly off the seat 26. Typically, the unsealing pressure may be in the range of 360–480 p.s.i.

The repeatability of the unsealing pressure seating of relief valve cores in accordance with the invention is extremely good due very largely to the presence of the antifriction washer 62. This permits the downward screwing of the body 32 and consequent rotation of the spring 46 without the rotation of the cup 48 and washer 56. This means that the washer 56 is not distorted against its seat during the installation operation and hence the pressure on the washer 56 at which unsealing occurs is known to a very accurate degree.

Additionally, because of the cup 48, there is no tendency for the washer 56 to extrude outward from its seat which similarly could cause large variances in the blow-off seating. Once the unsealing pressure has been exceeded, the washer 56, cup 48, and pin 42 rise with respect to the seat 26 permitting pressure relief. When the relief is achieved, however, the guide 58 neatly holds the pin 42 against lateral movement with respect to the pin and permits the washer 56 to reseal as if nothing had happened. Subsequent unsealings are uniformly repeatable at the same unsealing pressure.

It should be understood by those skilled in the art that while the invention has been described in only two embodiments, it is capable of many reasonable variations, all falling within the scope of the following claim language:

I claim:

1. In a pressure vessel having a tubular valve housing mounted in an opening therein, the housing having an interiorly threaded upper portion and an upwardly-facing valve seat therebelow; and a relief valve core in the housing comprising:
   a. an exteriorly threaded cylindrical body engaging the interior threads of the housing, the body having an axial recess extending up from the lower end thereof and a bridge extending transversely across the upper end thereof, the bridge having a bore on the axis of the body;
   b. a downwardly-facing plunger cup of lesser diameter than the body and disposed at the lower end of the core and having a flat radial wall and a connected downward sidewall;
   c. a sealing washer disposed in the cup and adapted to seat on the upwardly-facing valve seat to close the valve;
   d. pin means having an upper end extending through the bore in the bridge and being free for rotation with respect thereto and having the cup and washer mounted on the lower end thereof; and
   e. a spiral compression spring surrounding the pin and engaging the body with its upper end and with its lower end urging the cup and sealing washer away from the body toward engagement with the valve seat;

the improvement comprising a flat antifriction swivel washer disposed about the pin and engaged by the lower end of the compression spring and the upper surface of the radial wall of the cup, the washer having a plating of cadmium and extremely smooth radial surfaces, whereby when the body is screwed into the housing, the antifriction swivel washer permits the rotation of the body without rotation of the sealing washer.

2. In a pressure vessel having a tubular valve housing mounted in an opening therein, the housing having an interiorly threaded upper portion and an upwardly-facing valve seat therebelow; and a relief valve core in the housing comprising:
   a. an exteriorly threaded cylindrical body engaging the interior threads of the housing, the body having an axial recess extending up from the lower end thereof and a bridge extending transversely across the upper end thereof, the bridge having a bore on the axis of the body;
   b. a downwardly-facing plunger cup of lesser diameter than the body and disposed at the lower end of the core and having a flat radial wall and a connected downward sidewall;
   c. a sealing washer disposed in the cup and adapted to seat on the upwardly-facing valve seat to close the valve;
   d. pin means having an upper end extending through the bore in the bridge and being free for rotation with respect thereto and having the cup and washer mounted on the lower end thereof; and
   e. a spiral compression spring surrounding the pin and engaging the body with its upper end and with its lower end urging the cup and sealing washer away from the body toward engagement with the valve seat;

the improvement comprising a flat antifriction swivel washer disposed about the pin and engaged by the lower end of the compression spring and the upper surface of the radial wall of the cup, the washer having a hardness of at least 75 on the Rockwell B scale and extremely smooth radial surfaces, whereby when the body is screwed into the housing, the antifriction swivel washer permits the rotation of the body without rotation of the sealing washer.

3. The assembly as claimed in claim 2 wherein the swivel washer is finished with a plating of cadmium not exceeding 0.0003 inch in thickness.

4. In a pressure vessel having a tubular valve housing mounted in an opening therein, the housing having an interiorly threaded upper portion and an upwardly-facing valve seat therebelow; and a relief valve core in the housing comprising:
   a. an exteriorly threaded cylindrical body engaging the interior threads of the housing, the body having an axial recess extending up from the lower end thereof and a bridge extending transversely across the upper end thereof, the bridge having a bore on the axis of the body;
   b. a downwardly-facing plunger cup of lesser diameter than the body and disposed at the lower end of the core and having a flat radial wall and a connected downward sidewall;
   c. a sealing washer disposed in the cup and adapted to seat on the upwardly-facing valve seat to close the valve;
   d. pin means having an upper end extending through the bore in the bridge and being free for rotation with respect thereto and having the cup and washer mounted on the lower end thereof; and
   e. a spiral compression spring surrounding the pin and engaging the body with its upper end and with its lower end urging the cup and sealing washer away from the body toward engagement with the valve seat;

the improvement comprising a flat antifriction swivel washer disposed about the pin and engaged by the lower end of the compression spring and the upper surface of the radial wall of the cup, the washer having a finish not exceeding 63 microinches on its radial surfaces, whereby when the body is screwed into the housing, the antifriction swivel washer permits the rotation of the body without rotation of the sealing washer.

* * * * *